(12) United States Patent
Littau et al.

(10) Patent No.: US 7,222,810 B1
(45) Date of Patent: May 29, 2007

(54) MAGNETIC FISHING REEL CLICKER

(75) Inventors: Christopher S. Littau, Bartlettsville, OK (US); Joshua M. Denton, Broken Arrow, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 11/406,174

(22) Filed: Apr. 18, 2006

(51) Int. Cl.
*A01K 89/02* (2006.01)
(52) U.S. Cl. ................................ 242/305; 242/306
(58) Field of Classification Search ............... 242/305, 242/306
See application file for complete search history.

(56) References Cited

U.S. PATENT DOCUMENTS

| | | | |
|---|---|---|---|
| 4,043,521 A | 8/1977 | Hull | |
| 4,549,703 A * | 10/1985 | Atobe | ............... 242/288 |
| 4,685,632 A | 8/1987 | Yeh | |
| 4,695,009 A | 9/1987 | Swisher | |
| 5,505,396 A | 4/1996 | Chesterfield et al. | |
| 5,556,049 A | 9/1996 | Bennett et al. | |
| 5,692,692 A | 12/1997 | Zwayer | |
| 5,950,949 A * | 9/1999 | Cockerham | ............... 242/289 |
| 6,206,311 B1 * | 3/2001 | Kim et al. | ............... 242/288 |
| 6,315,228 B1 * | 11/2001 | Sato | ............... 242/312 |
| 6,867,680 B1 * | 3/2005 | Kulle | ............... 338/32 H |
| 7,077,351 B2 * | 7/2006 | Myojo et al. | ............... 242/310 |

FOREIGN PATENT DOCUMENTS

JP         11169037 A  *  6/1999

* cited by examiner

*Primary Examiner*—Emmanuel M Marcelo
(74) *Attorney, Agent, or Firm*—Fellers, Snider, Blankenship, Bailey & Tippens

(57) ABSTRACT

A clicker mechanism for a fishing reel is described. A typical fishing reel has a spool defining an orifice and a shaft passing through the orifice. A component having an irregular surface, such as a gear-like component with teeth or a ring defining a serrated inner surface engages the shaft. A clicker assembly may be affixed to the spool. The clicker assembly includes a clicker for engaging the clicker gear. The clicker alternately moves from a first position to a second position. The clicker assembly utilizes a magnet that provides a magnetic force to return the clicker to the first position from the second position. Two magnets may be used to exert magnetic force against one another, either with an attracting or a repelling force.

21 Claims, 5 Drawing Sheets

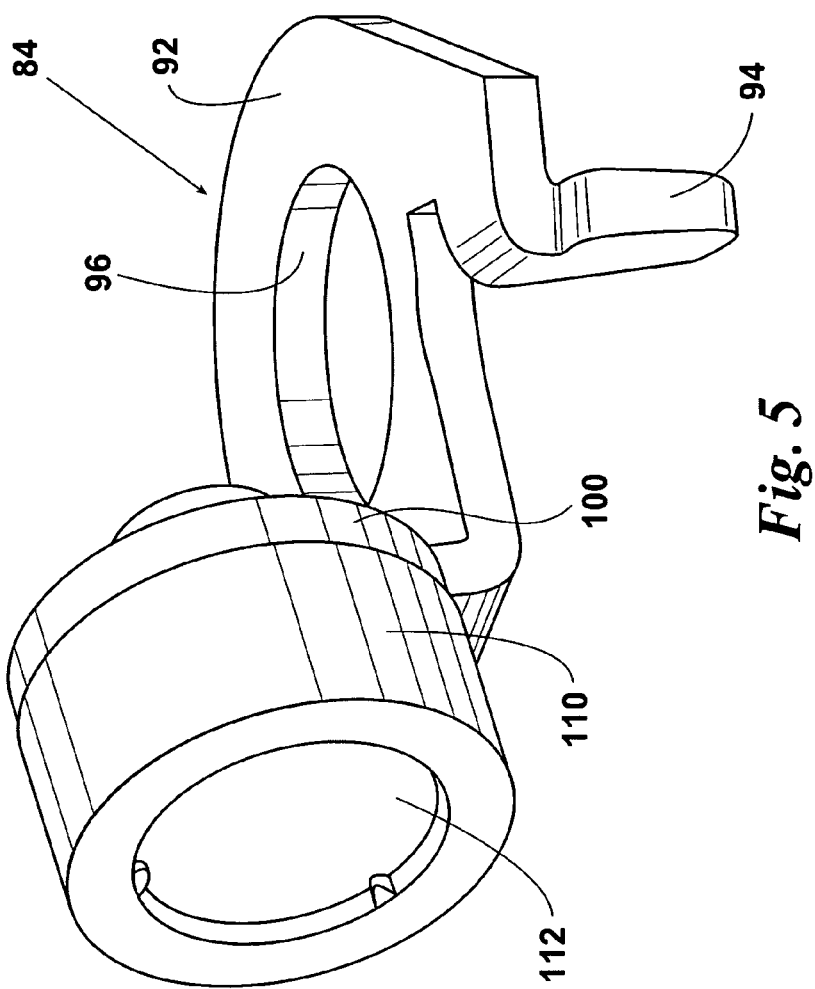
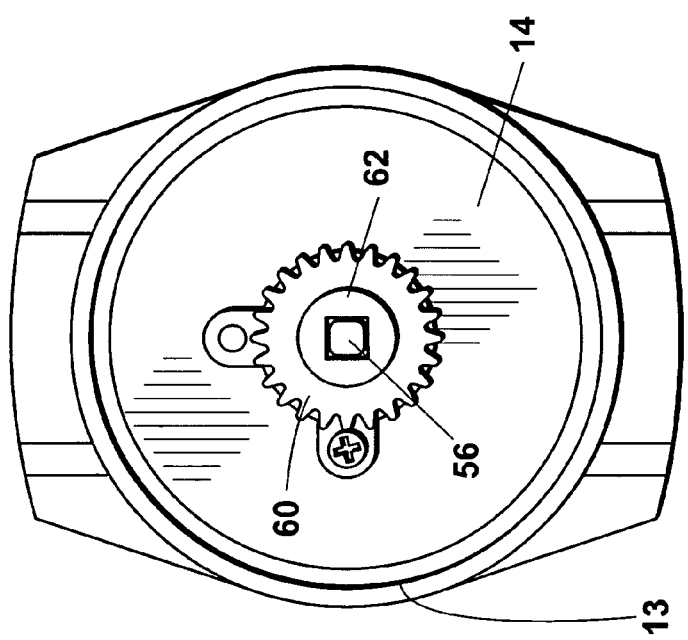
Fig. 5
Fig. 3

MAGNETIC FISHING REEL CLICKER

FIELD OF THE INVENTION

This invention relates generally to the use of magnetic force to actuate or locate a clicker mechanism.

BACKGROUND OF THE INVENTION

Various types of fishing reels are known in the art. An example of a common fishing reel is a spinning reel. A typical spinning reel has a body having a mounting structure extending from the top of the body for mounting the reel beneath a fishing rod. A pinion sleeve is rotatably mounted through a front end of the body. A rotor assembly is secured to a forward end of the pinion sleeve. A main shaft slidably extends through the pinion sleeve and through the rotor assembly. A line spool is secured on a forward end of the main shaft. A bail wire assembly is attached to the rotor assembly for grasping a fishing line to facilitate winding of the line around a line spool. A drive shaft extends laterally into the side of the body structure. A crank handle is secured on the exterior end of the drive shaft. A drive gear (e.g., a face gear) is mounted on the interior portion of the drive shaft and an oscillation mechanism is provided for imparting reciprocating movement to the main shaft and the line spool.

Typically, the drive gear meshes with a pinion gear (e.g. a helical gear) formed on the pinion sleeve such that turning of the crank handle imparts rotational movement to the rotor assembly. As the rotor assembly rotates, the oscillation mechanism imparts reciprocating movement to the main shaft and the line spool. The reciprocating movement of the line spool ensures that the fishing line is properly wound over the width of the spool. The oscillation mechanism may also prevent the main shaft and the line spool from rotating during the winding operation.

The spool of the spinning reel is typically retained on the main shaft by means of a frictional system (i.e., a drag system), which deters rotation of the spool when simply reeling in a fishing lure but allows the spool to rotate with respect to the main shaft when sufficient pull is applied to the fishing line. Thus, for example, when a fish fights against the fisherman's efforts to reel it in, the frictional system responds by yielding/playing-out sufficient line, as necessary, to prevent the line from breaking. A clicker mechanism is typically employed to alert the fisherman when the frictional system is allowing fishing line to play-out.

Spinning reels commonly also include drag adjustment systems for selectively adjusting the amount of rotational resistance (i.e., drag) provided between the main shaft and line spool assembly. Such drag systems typically include a spring-loaded adjustment knob or dial rotatably secured at the distal end of the main shaft. A base plate, collar, or other structure typically extends radially from the main shaft and is attached to the main shaft such that the plate, collar or other structure is prevented from rotating with respect to the main shaft. A friction-reducing washer or other friction-reducing member is positioned between the interior end wall of the spool and the base plate. A plurality of friction drag plates or other structures are positioned inside the spool between the interior end thereof and the drag knob. The drag plates are typically of alternating configurations such that every other drag plate is keyed or otherwise secured on the main shaft such that the drag plate cannot rotate with respect to the main shaft, and the remaining interspersed drag plates are keyed to, and rotate with, the spool. Friction-reducing washers or other friction-reducing structures are typically positioned between the drag plates.

The amount of drag provided by the drag system can be increased by turning the drag knob in a tightening direction (typically clockwise) such that the drag dial moves and holds the drag plates and spool closer together and closer to the stationary base plate. Of course, the amount of drag provided can also be reduced as desired by simply rotating the drag knob in the opposite direction.

During the course of normal use, components of the reel are typically exposed to fresh water or salt water. Consequently, some components may experience corrosion that may reduce the effectiveness of the component. One component in particular that is susceptible to corrosion is the clicker mechanism. A typical clicker mechanism utilizes coil or leaf springs to bias the clicker mechanism towards a gear-type device. A difficulty associated with conventional springs is fatigue, which may result in breakage of the spring resulting from use over an extended period of time. Fatigue is especially severe in corrosive environments, such as a salt water environment, which further reduces the life of the mechanism. Although clickers are discussed above in the context of spinning reel clickers, clickers may also be utilized in other types of fishing reels where similar difficulties may also be encountered

SUMMARY OF THE INVENTION

The instant invention is directed to an improved clicker mechanism. The clicker mechanism of the invention utilizes magnets that are used to bias the clicker mechanism. When properly located, multiple magnets or multiple magnetic/ferrous pieces can provide an appropriate attracting and/or opposing force on each other that will create a force sufficient to bias the clicker mechanism.

An example clicker assembly utilizes two (2) magnets to actuate the clicker mechanism. A first sub-assembly is secured tightly to a spool. A second sub-assembly pivots about a post that is spaced an appropriate distance away from the spool. Each sub-assembly is provided with a magnet. The interaction of the magnets provides an attracting force. Alternatively the interaction of the magnets provides an opposing force. The force acts to continuously hold the clicker assembly in a starting position. When actuated, e.g., when the spool is rotated so that clicker interacts with the clicker gear, the magnetic force acts to push or pull the clicker back to the starting position.

Magnetic clickers may be used anywhere where conventional spring clickers are used. Examples of magnetic clickers include clickers for use as drag indicators, strike indicators, bait indicators, drag knob clickers, spool clickers and crank clickers.

BRIEF DESCRIPTION OF THE DRAWINGS

FIG. 3 is a plan view of the rotor body of FIG. 2.

FIG. 5 is a perspective view of components associated with the clicker sub-assembly of FIG. 4.

DESCRIPTION OF THE PREFERRED EMBODIMENTS

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Figure 1:
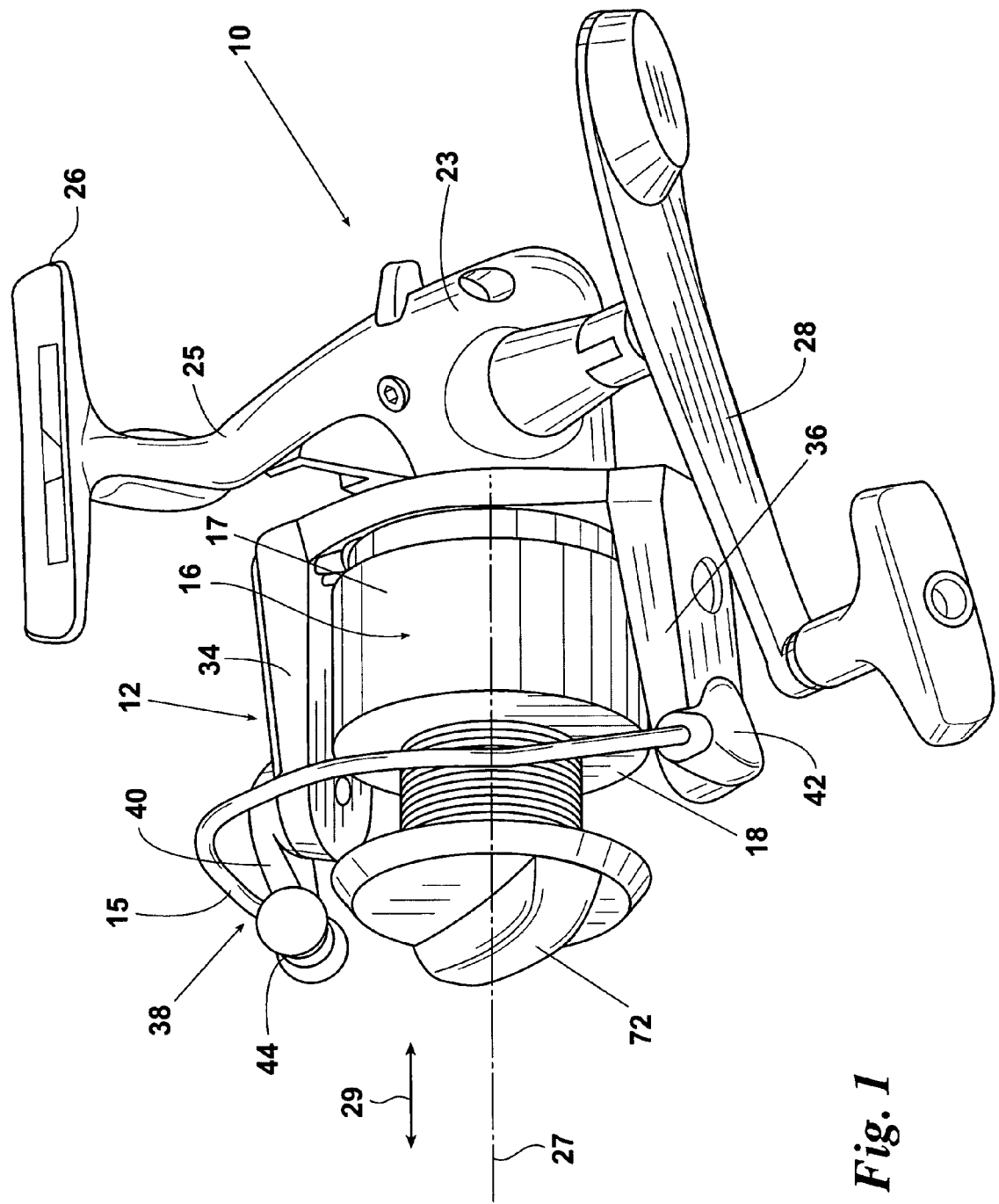
FIG. 1 is a perspective view of a spinning reel.
Figure 2:
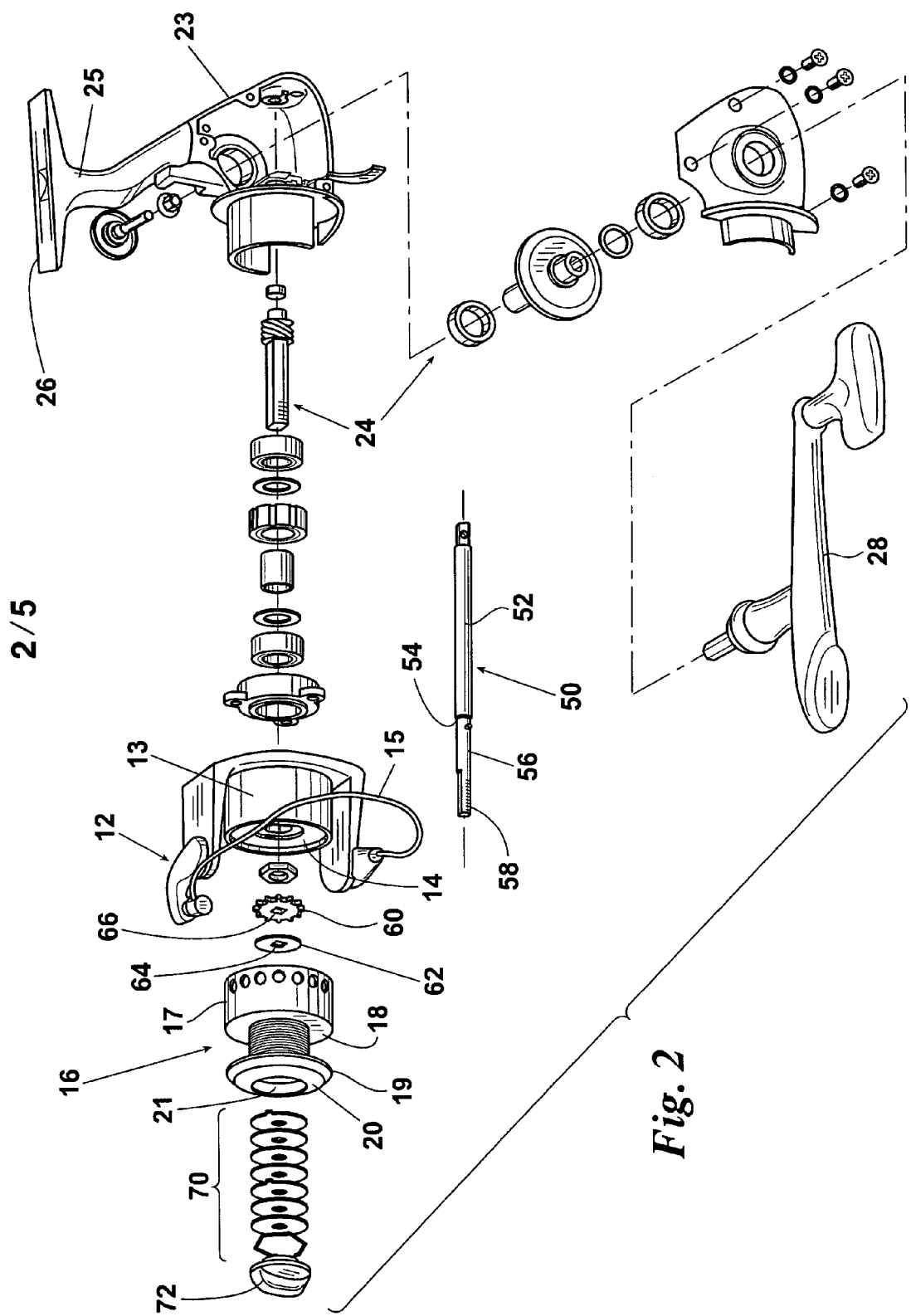
FIG. 2 is an exploded view of the spinning reel of FIG. 1.
Figure 4:
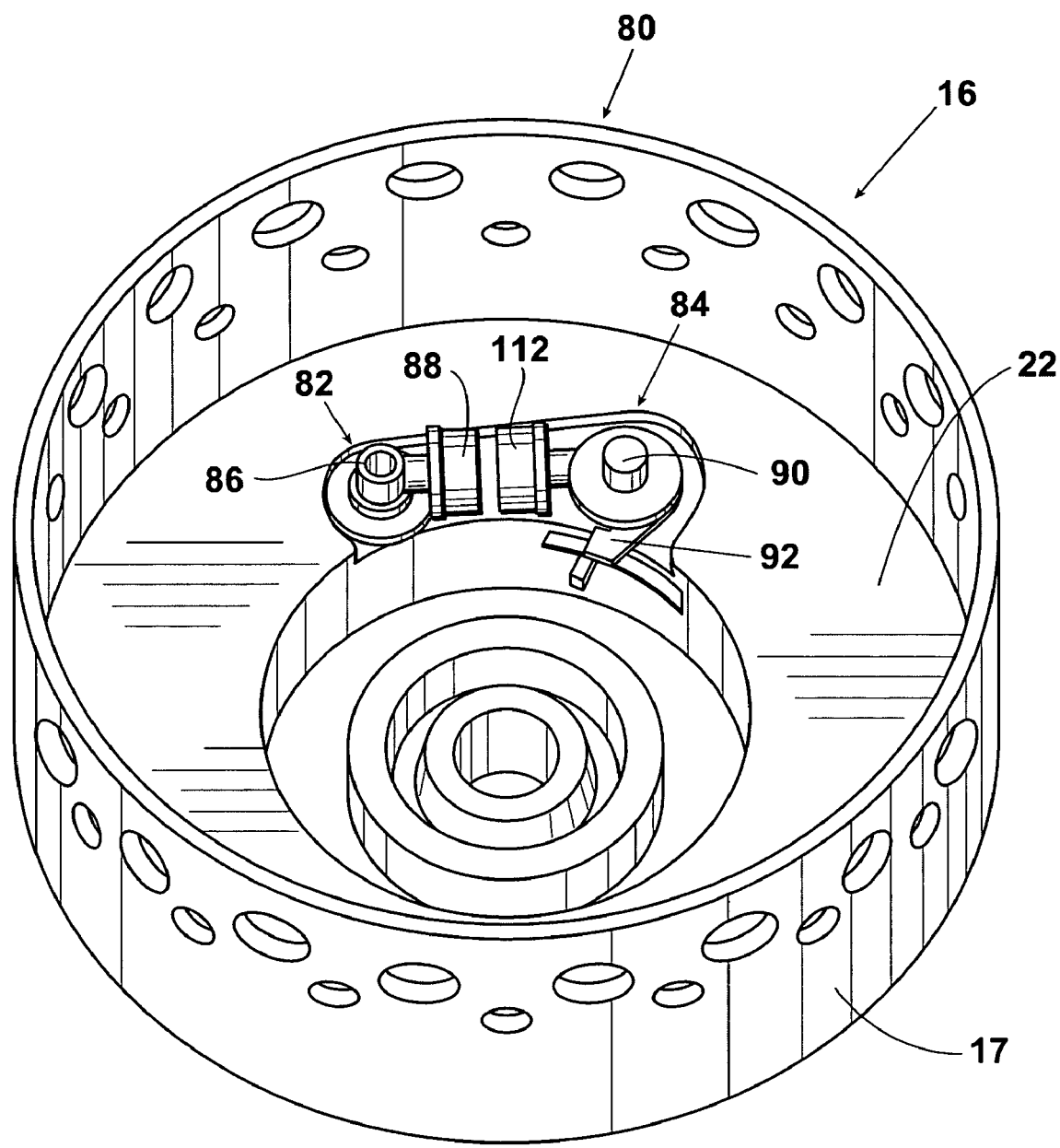
FIG. 4 is a perspective view of the spool of FIG. 2 showing the clicker mechanism mounted therein.

Referring now to FIG. 1, a spinning-type fishing reel, according to the present invention, is designated generally as 10. Spinning reel 10 has a rotor 12. Rotor 12 has a generally cylindrical rotor body 13 (FIG. 2), which defines a rotor face 14 (FIGS. 2 and 3). Bail wire 15 is provided to wrap a supply of line around spool 16 at the front of reel 10. Spool 16 defines a skirt 17, a spool shoulder 18, a spool lip 19 (FIG. 2), a spool cap 20 (FIG. 2), spool cap cavity 21 (FIG. 2), and spool face 22 (FIG. 4). It should be understood that reel 10 described herein is only exemplary of the environment for the invention. Many variations in the configuration of reel 10 shown are contemplated by the invention. Particularly, it is contemplated that the clicker of the invention may be utilized with other types of reels such as trolling reels or other types of fishing reels.

Reel 10 has main housing 23 that encases operating mechanism 24 (FIG. 2). Housing 23 has an integrally formed stem 25 that terminates at foot 26, which is attachable to a fishing rod (not shown) by conventional means.

Rotor 12 is rotated about a central longitudinal axis 27 (FIG. 1) by crank handle 28, which is operably connected to operating mechanism 24. As rotor 12 is rotated, fishing line is continuously wrapped about spool 16. Operating mechanism 24 includes structure for oscillating spool 16 in fore and aft direction, as indicated by the double-headed arrow 29 (FIG. 1), as rotor 12 rotates, to thereby assure that the line is evenly distributed over the surface of spool 16 between spool shoulder 18 and spool lip 19.

Rotor 12 has diametrically, oppositely located first and second ears 34, 36. Ears 34, 36 cooperatively define a support for a movable bail assembly 38. Bail assembly 38 has a first bail arm 40 mounted to first bail ear 34 and second bail arm 42 mounted to second bail ear 36. The ends of U-shaped bail wire 15 are fixedly attached, one each to the bail arms 40, 42, so that the bail arms 40, 42 and bail wire 15 are movable as a unit.

First bail arm 40 is connected to the first bail ear 34 to be pivotable relative thereto about an axis. In like manner, the second bail arm 42 is attached to the second bail ear 36 for pivoting movement relative thereto about a parallel axis. With this arrangement, the bail assembly 38 is pivotable as a unit relative to the rotor 12 about the axes between a first position, or cast position, and a second position, or retrieve position. Through an over-center bias mechanism (not shown) within at least one (1) of the bail ears 34, 36, the bail arms 40, 42, and thus the entire bail assembly 38, are biased into the cast and retrieve positions as the bail assembly 38 approaches each.

When bail assembly 38 is in the cast position, line is allowed to freely pay off the spool 16. To change the bail assembly 38 from the cast position to the retrieve position, crank handle 28 is turned. A mechanism is typically provided that is activated by rotation of rotor 12 that causes the bail assembly 38 to be deflected out of the cast position and into the retrieve position upon rotation of crank handle 28.

In the transition from the cast position to the retrieve position, the line is guided along an edge of bail wire 15 and onto line roller 44. With reel 10 in the retrieve position, the line extends from spool 16, around cylindrical line roller 44, and forwardly from line roller 44 away from reel 10.

Operation of crank handle 28, with bail assembly 38 in the retrieve position causes rotor 12 to rotate clockwise about axis 27 as viewed from the front of spool 16. Rotation of rotor 12 brings fishing line against the line roller 44 and causes the line to wrap around spool 16 as rotor 12 rotates.

Referring now primarily to FIG. 2, a main shaft 50 communicates with operating mechanism 24. Main shaft 50 has a cylindrical segment 52 that terminates at shoulder 54. Main shaft 50 additionally has a driving segment 56, e.g., a rectangular segment. Driving segment 56 is provided with threaded end 58. Main shaft 50 passes through a central aperture in rotor 12 and through a central aperture in spool 16. Cylindrical segment 52 of main shaft 50 rotatably passes through rotor 12 with said cylindrical segment 52. Rotor 12 is mounted in such a way to allow for relative rotation between the main shaft 50 and the rotor 12. Driving segment 56 of main shaft 50 passes through spool 16. Relative rotation of said spool 16 with respect to said main shaft 50 is permitted.

A clicker gear 60 (FIGS. 2 and 3) and washer 62 (FIGS. 2 and 3) are located on main shaft 50 between rotor face 14 of rotor body 13 and spool 16. Clicker gear 60 and washer 62 are fixedly mounted on main shaft 50, preferably by means of polygonal openings 64, 66 that mate with driving section 56 of main shaft 50.

Skirt 17 of spool 16 surrounds rotor body 13 and rotates relative thereto. Drag washers 70 are located within spool cap cavity 21 wherein alternating drag washers 70 are keyed to driving segment 56 of main shaft 50 in a similar manner to clicker gear 60 and washer 62. Drag dial 72 is threadably received on threaded end 58 of main shaft 50 and is provided to selectively compress drag washers 70 for adjusting drag, i.e., for adjusting frictional resistance of spool 16 to rotate with respect to main shaft 50.

Referring now to FIG. 4, shown is an enlarged view of spool 16. Spool skirt 17 is shown surrounding spool face 22. Clicker assembly 80 is located within the space defined by spool skirt 17 and spool face 22. Clicker assembly 80 is made up of anchor sub-assembly 82 and clicker sub-assembly 84. Anchor sub-assembly 82 is affixed to spool face 22 at anchor 86. Anchor sub-assembly 82 supports first magnet 88.

Referring now to FIGS. 4 and 5, pivot post 90 protrudes from spool face 22. Clicker sub-assembly 84 is pivotally attached to pivot post 90. Clicker sub-assembly 84 is made up of body 92 that defines clicker 94, post orifice 96 for receiving pivot post 90 and magnet bracket 100 for receiving magnet holder 110. Second magnet 112 is received within magnet holder 110.

Magnets 88 and 112 actuate the clicker mechanism either via an attracting force or a repelling force. Anchor sub-assembly 82 is secured to anchor 86. Clicker sub-assembly 84 pivots about pivot post 90. When spool 16 is rotated, clicker 94 interacts with clicker gear 60, which displaces body 92 of clicker sub-assembly 84 into a secondary position. The magnetic force functions to return the clicker assembly to a starting position.

Clicker 94 is the mechanism that interacts with clicker gear 60. Magnet holder 110 is preferably secured to magnet bracket 100 via heat staking, orbital staking, or insert molding. Second magnet 112 is preferably press fit into magnet holder 110 and its surface sealed with a two-part epoxy to protect second magnet 112 from the ambient environment. Protecting magnets 88, 112 is desirable since magnets are extremely prone to corrosion.

Figure 6:
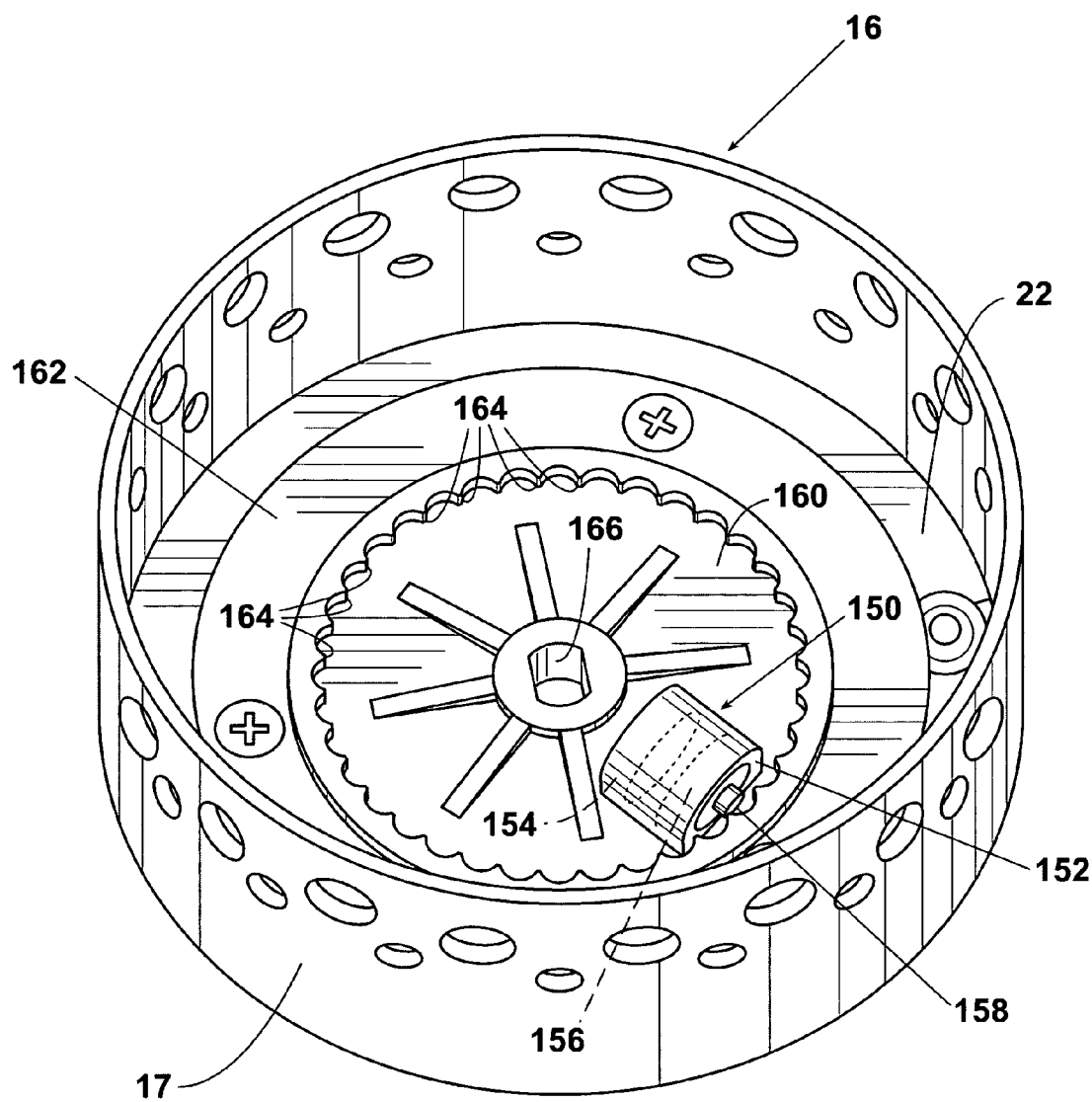
FIG. 6 is a perspective view of the spool of FIG. 2 showing a second embodiment of the clicker mechanism mounted therein.

Referring now to FIG. 6, shown is an enlarged view of spool 16 having a second embodiment of a clicker assembly mounted therein. Spool skirt 17 is shown surrounding spool face 22. Clicker assembly 150 is located within the space defined by spool skirt 17 and spool face 22. Clicker assembly 150 is made up of clicker housing 152, which contains base magnet 154 and piston magnet 156. Clicker 158 protrudes from piston magnet 156. Clicker housing 152 is secured to clicker mount plate 160. Clicker mount plate 160 is rotatably secured to spool 16 with serrated ring 162. Serrated ring 162 defines a plurality of inwardly facing serrations 164. Clicker mount plate 160 defines an engaging orifice 166 for rotatably affixing clicker mount plate 160 to driving segment 56 of main shaft 50.

Base magnet 154 and piston magnet 156 interact to generate a repelling force for forcing piston magnet 156 outwardly, where clicker 158 is forced into engagement with serrations 164 of serrated ring 162. When spool 16 is rotated, attached serrated ring 162 rotates therewith, which causes serrations 164 to be moved laterally relative to clicker 158. As the serrations 164 pass over clicker 158, clicker 158 is alternately pushed towards base magnet 154 and forced into recesses between the peaks of serrations 164, thereby making an audible clicking sound.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A fishing reel comprising:
a rotor defining an orifice;
a shaft passing through said orifice;
a component driven by said shaft, said component having an irregular engaging surface;
a spool mounted on said shaft;
a clicker assembly affixed to said spool, wherein said clicker assembly comprises a clicker for engaging said irregular engaging surface of said component for alternately moving said clicker from a first position to a second position;
wherein said clicker assembly comprises a magnet that provides a magnetic force to return said clicker to said first position from said second position.

2. The fishing reel according to claim 1 wherein:
said magnet is a second magnet; and further comprising a first magnet affixed to said spool for operatively engaging said second magnet.

3. The fishing reel according to claim 1 wherein:
said spool is a component in a spinning reel.

4. The fishing reel according to claim 1 wherein:
said clicker and said component engage for alerting a user when a drag mechanism is activated.

5. The fishing reel according to claim 1 wherein:
said magnetic force is an attracting force.

6. The fishing reel according to claim 1 wherein:
said magnetic force is an opposing force.

7. The fishing reel according to claim 1 wherein:
said component with an irregular engaging surface is substantially gear shaped with a plurality of protrusions on a perimeter thereof.

8. The fishing reel according to claim 1 wherein:
said component with an irregular engaging surface is a ring having an inner diameter that defines a plurality of protrusions thereon.

9. The fishing reel according to claim 1 wherein:
wherein said clicker assembly comprises an anchor sub-assembly and a clicker sub-assembly.

10. The fishing reel according to claim 1 wherein:
said clicker assembly comprises a clicker housing containing a base magnet and a piston magnet.

11. A clicker assembly comprising:
a first magnet affixed to a base;
a second magnet proximate to said first magnet and movably retained proximate to said first magnet;
a clicker operatively connected to said second magnet;
a component defining protrusions thereon, said protrusions to engage and displace said clicker from a first position to a second position when relative movement exists between said component and said clicker and wherein an audible clicking sound is generated from interaction of said component and said clicker; and
wherein a magnetic force is present between said first magnet and said second magnet, said magnetic force for returning said clicker from said second position to said first position.

12. The clicker assembly according to claim 11 wherein:
said base comprises a portion of a spool in a fishing reel.

13. The clicker assembly according to claim 12 wherein:
said fishing reel is a spinning reel.

14. The clicker assembly according to claim 11 wherein:
said interaction of said clicker and said protrusions function as a drag clicker.

15. The clicker assembly according to claim 11 wherein:
said second magnet is located in a clicker sub-assembly; and
said clicker sub-assembly is pivotally affixed to said base.

16. The clicker assembly according to claim 11 wherein:
said component is gear shaped; and
said protrusions are gear teeth.

17. The clicker assembly according to claim 11 wherein:
said magnetic force is an attracting force.

18. The clicker assembly according to claim 11 wherein:
said magnetic force is an opposing force.

19. A method of imparting force on a clicker mechanism of a fishing reel comprising the steps of:
applying magnetic force to a clicker member of a fishing reel for returning said clicker member to a first position from a second position.

20. The method of imparting force on a clicker mechanism of a fishing reel according to claim 19 wherein:
said magnetic force is an attracting force.

21. The method of imparting force on a clicker mechanism of a fishing reel according to claim 19 wherein:
said magnetic force is an opposing force.

* * * * *